US008332843B2

(12) United States Patent
Hasegawa (10) Patent No.: US 8,332,843 B2
(45) Date of Patent: Dec. 11, 2012

(54) INFORMATION PROCESSING APPARATUS AND CONTROL METHOD FOR INSTALLING DRIVER SOFTWARE (75) Inventor: Reiji Hasegawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 929 days.

(21) Appl. No.: 12/443,208

(22) PCT Filed: Nov. 7, 2007

(86) PCT No.: PCT/JP2007/072046
§ 371 (c)(1),
(2), (4) Date: Mar. 27, 2009

(87) PCT Pub. No.: WO2008/065886
PCT Pub. Date: Jun. 5, 2008

(65) Prior Publication Data
US 2010/0031250 A1 Feb. 4, 2010

(30) Foreign Application Priority Data
Nov. 30, 2006 (JP) .................................. 2006-322720

(51) Int. Cl.
*G06F 9/445* (2006.01)
*G06F 9/44* (2006.01)
(52) U.S. Cl. .......................... 717/174; 717/171; 717/177
(58) Field of Classification Search .......... 717/168–171, 717/174–177; 709/203–204
See application file for complete search history.

(56) References Cited

U.S. PATENT DOCUMENTS

| 5,367,698 | A | * | 11/1994 | Webber et al. | ................ | 709/203 |
| 5,963,743 | A | * | 10/1999 | Amberg et al. | ............... | 717/174 |
| 6,167,567 | A | * | 12/2000 | Chiles et al. | .................. | 717/173 |
| 6,493,871 | B1 | * | 12/2002 | McGuire et al. | ............... | 717/173 |
| 6,598,223 | B1 | * | 7/2003 | Vrhel et al. | .................... | 717/174 |
| 6,671,749 | B2 | * | 12/2003 | Williams et al. | ................ | 710/10 |
| 6,775,829 | B1 | * | 8/2004 | Kroening | ...................... | 717/175 |

(Continued)

FOREIGN PATENT DOCUMENTS

JP 2001-96868 4/2001

(Continued)

OTHER PUBLICATIONS

Khalifa et al., Drivers for software development method usage, IEEE, vo. 47, No. 3, pp. 360-369, 2000.*

(Continued)

*Primary Examiner* — Anil Khatri
(74) *Attorney, Agent, or Firm* — Fitzpatrick, Cella, Harper & Scinto (57) ABSTRACT

When a peripheral device is connected to a host apparatus for the first time, an easy and secure installation of the driver of the peripheral device into the host apparatus is made possible. A printer 102, and a storage 103 storing a driver 104 for the printer 102 and an installer thereof, which function on a PC 200 are connected, as USB devices 111, 112, to a USB hub 110. An installation flag 105 records a value indicating an installation state of the driver 104. When the PC 200 is connected to the USB hub 110, if the value of the installation flag 105 indicates "non-installed", the PC 200 is so controlled as to make access only to the storage 103. If the value of the installation flag 105 indicates "already installed", the PC 200 is so controlled as to make access to the storage 103 and the printer 102.

13 Claims, 7 Drawing Sheets

U.S. PATENT DOCUMENTS

| | | | |
|---|---|---|---|
| 6,823,508 B1 * | 11/2004 | Burkhardt et al. | 717/174 |
| 6,947,171 B1 | 9/2005 | Narusawa et al. | 358/1.6 |
| 6,976,252 B2 * | 12/2005 | White et al. | 717/174 |
| 7,150,025 B2 * | 12/2006 | Gentry et al. | 719/327 |
| 7,228,541 B2 * | 6/2007 | Gupton et al. | 717/175 |
| 7,478,385 B2 * | 1/2009 | Sierer et al. | 717/174 |
| 7,503,041 B2 * | 3/2009 | Butterweck et al. | 717/168 |
| 7,886,291 B1 * | 2/2011 | Jones et al. | 717/174 |
| 7,945,897 B1 * | 5/2011 | Cook | 717/121 |
| 8,010,961 B1 * | 8/2011 | Cook et al. | 717/174 |
| 8,219,910 B2 * | 7/2012 | Kim | 715/705 |

FOREIGN PATENT DOCUMENTS

| | | |
|---|---|---|
| JP | 2001-256170 | 9/2001 |
| JP | 2001-256170 A | 9/2001 |
| JP | 2003-114859 | 4/2003 |
| JP | 2003-114859 A | 4/2003 |
| JP | 2003-150530 | 5/2003 |

OTHER PUBLICATIONS

Navas et al., Efficient and adapted component based strategies for embedded software device drivers development, IEEE, pp. 514-519, 2009.*

Fitzpatrick et al., Startegic drivers of software quality: beyond external and internal software quality, IEEE, pp. 65-72, 2001.*

Mantyla et al., "Drivers for software refactoring decisions", ACM ISESE, pp. 297-306, 2006.*

Jun. 11, 2009 International Preliminary Report on Patentability in International PCT Patent Appln. No. PCT/JP2007/072046.

International Search Report and Written Opinion in PCT/JP2007/072046.

* cited by examiner

STORAGE CLASS

FIG. 8

PRINTER CLASS CONFIGURATION

FIG. 9

COMPOSITE CONFIGURATION

INFORMATION PROCESSING APPARATUS AND CONTROL METHOD FOR INSTALLING DRIVER SOFTWARE

TECHNICAL FIELD

The present invention relates to an information processing apparatus having an information processing unit, connected to a host apparatus and adapted to execute a prescribed information processing as a peripheral device, and to a control method for an information processing apparatus.

BACKGROUND ART

Recently, there is developed an apparatus of composite functions, constructed as a peripheral device to be used by connection to a host apparatus such as a personal computer (hereinafter represented as a PC). For example, in case of printers, an interface such as USB (universal serial bus) is provided for connection to a PC as a print output device. Also, among such printers, some have a memory card reader whereby an image in the memory card, taken, for example, by a digital camera, can be directly printed by the printer without relying on a PC.

In such printer equipped with a memory card reader, there is known a construction, as disclosed in Japanese Patent Application Laid-Open No. 2001-96868, that the memory card can be recognized by a PC through an interface such as USB, thereby providing also a function as a PC card reader.

Such a PC peripheral device having plural functions can function, by causing a PC to recognize such plural functions, as if plural devices were connected to the PC when observed from the PC side.

In order that the PC can recognize such plural functions as separate devices, there is required, in addition to the interface control at the peripheral device side, to install drivers in the operating system (OS) of the PC. The latest OS already has drivers for ordinary devices such as a keyboard and a mouse. This applies also to devices of a class called storage class in the USB standard, such as a memory card reader described above and a hard disc. Therefore, in the devices such as a keyboard, a mouse, and a memory card reader or a hard disc of storage class, the driver is automatically loaded by merely connecting the device through USB, whereby the content of the memory card or the hard disc can be accessed immediately.

DISCLOSURE OF THE INVENTION

On the other hand, it is very difficult to adopt a common driver for a peripheral device in which the control is significantly different for different models, such as a printer or an image scanner. It has therefore been necessary, for a peripheral device such as a printer or an image scanner, that each manufacturer includes a recording medium such as a CD, recording therein an exclusive driver, in the product package of the peripheral device.

In a normal procedure, the peripheral device is connected by USB after installing the driver, whereby the peripheral device is recognized by OS and becomes usable. However, in the case that the user does not know such procedure and connects the peripheral device at first without installing the driver, OS may assign a dummy driver. In such case, there results a problem that the device cannot be operated properly even when the driver is installed afterwards. Also in certain OS, in order to recover from such state, it is necessary to remove the installed dummy driver by a particular procedure.

Therefore, in order to avoid the necessity of including a recording medium such as a CD, recording an exclusive driver, in the product package of the peripheral device, there is known such a construction, as disclosed in Japanese Patent Application Laid-Open No. 2003-150530, that the peripheral device has composite functions, mounts a storage class on the peripheral device and stores drivers in the storage.

Such construction eliminates the necessity of including the driver CD in the product package, but cannot solve the problems that the proper operation is inhibited by the dummy driver and that the dummy driver needs to be deleted.

Also in certain peripheral devices, a protective seal describing the procedure is adhered on the USB port, in order to avoid an erroneous connection of the device to the PC by the user before the driver installation, but this method is merely to avoid the problem by calling attention of the user and is not a fundamental solution to the problem. Also such method involves a problem of increased costs for printing of the seal and for a step of seal adhesion.

An object of the present invention is to solve the aforementioned problems. Thus, when a peripheral device is connected to a host apparatus for the first time, the present invention can make it easy and secure to install the driver software of the peripheral device in the host apparatus, thereby enabling proper operation of the peripheral device.

The present invention provides an information processing apparatus including an information processing unit which is connected to a host apparatus and executes a prescribed information processing as a peripheral device, a storage unit which stores a driver software to function on the host apparatus for utilizing the information processing unit by the host apparatus and an installer for the driver software, and an interface unit which is capable of connecting the information processing unit and the storage unit with the host apparatus, a control method for the information processing apparatus and a control program for the information processing apparatus, wherein employed is an installation flag assuming a value indicating that the driver software is not installed in the host apparatus or a value indicating that the driver software is already installed in the host apparatus, and when the host apparatus is connected to the interface unit, the interface unit is so controlled, in the case that a value of the installation flag indicates the non-installed state, as that the host apparatus can access only the storage unit for reading and executing the installer, and, in the case that the value of the installation flag indicates the already installed state, as that the host apparatus can access the storage unit and the information processing unit.

Further features of the present invention will become apparent from the following description of exemplary embodiments with reference to the attached drawings.

BEST MODE FOR CARRYING OUT THE INVENTION

In the following, two embodiments will be described with reference to the accompanying drawings, as exemplary best modes for carrying out the present invention. In the following embodiments, a printer will be taken as the peripheral device, and there will be described a construction for securely installing a driver software therefor in a PC serving as the host apparatus. In the following description, the printer as the peripheral device is merely an example, and the present invention may also be carried out in a construction including an image scanner and a storage, or in a construction of a composite device including both a printer and an image scanner and equipped with a storage. Thus, the principal function of the peripheral device in the present invention need not be a printer.

Embodiment 1

Figure 1:
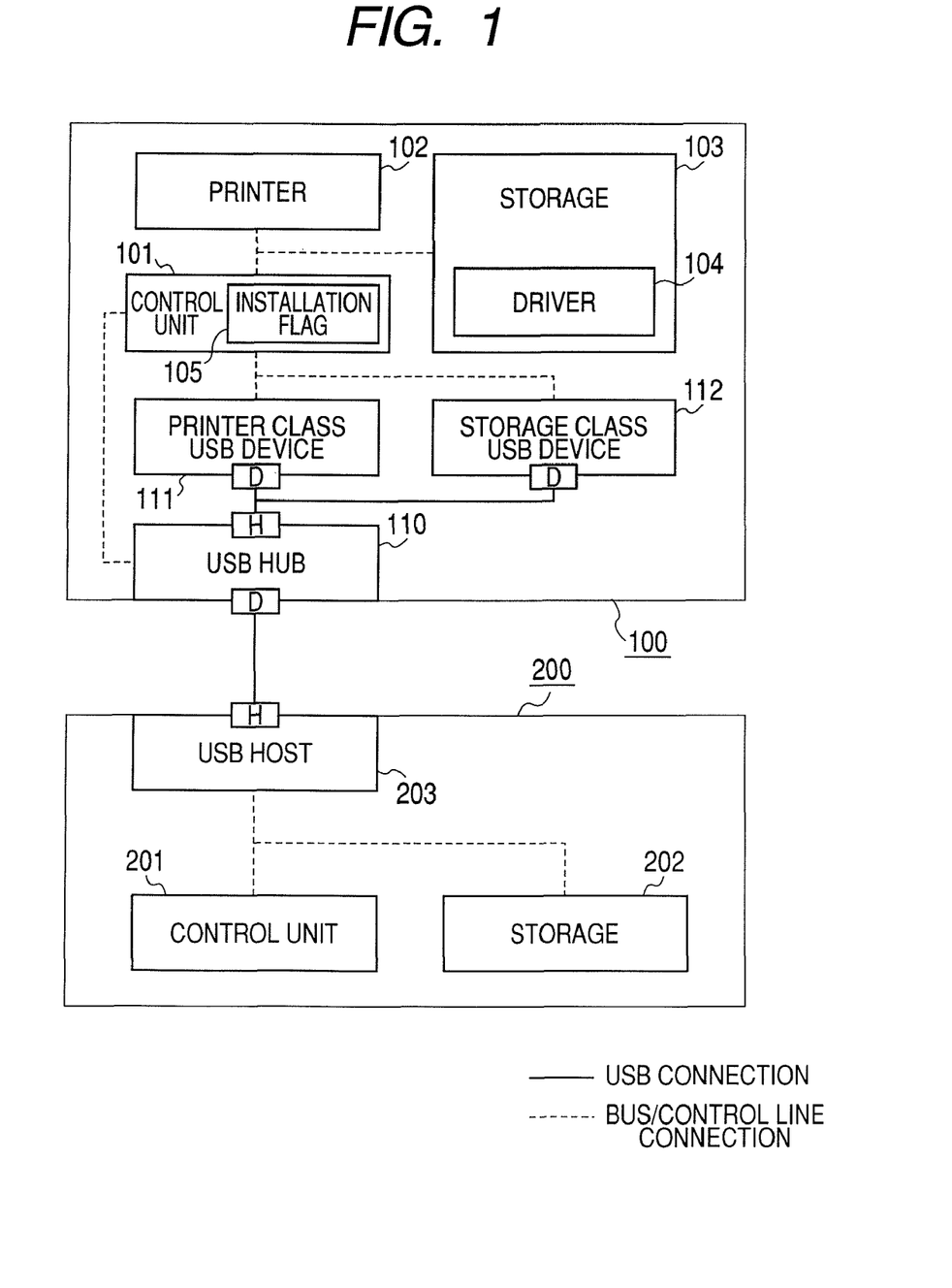
FIG. 1 is an explanatory view illustrating a system configuration including a peripheral device utilizing the present invention (Embodiment 1).
Figure 3:
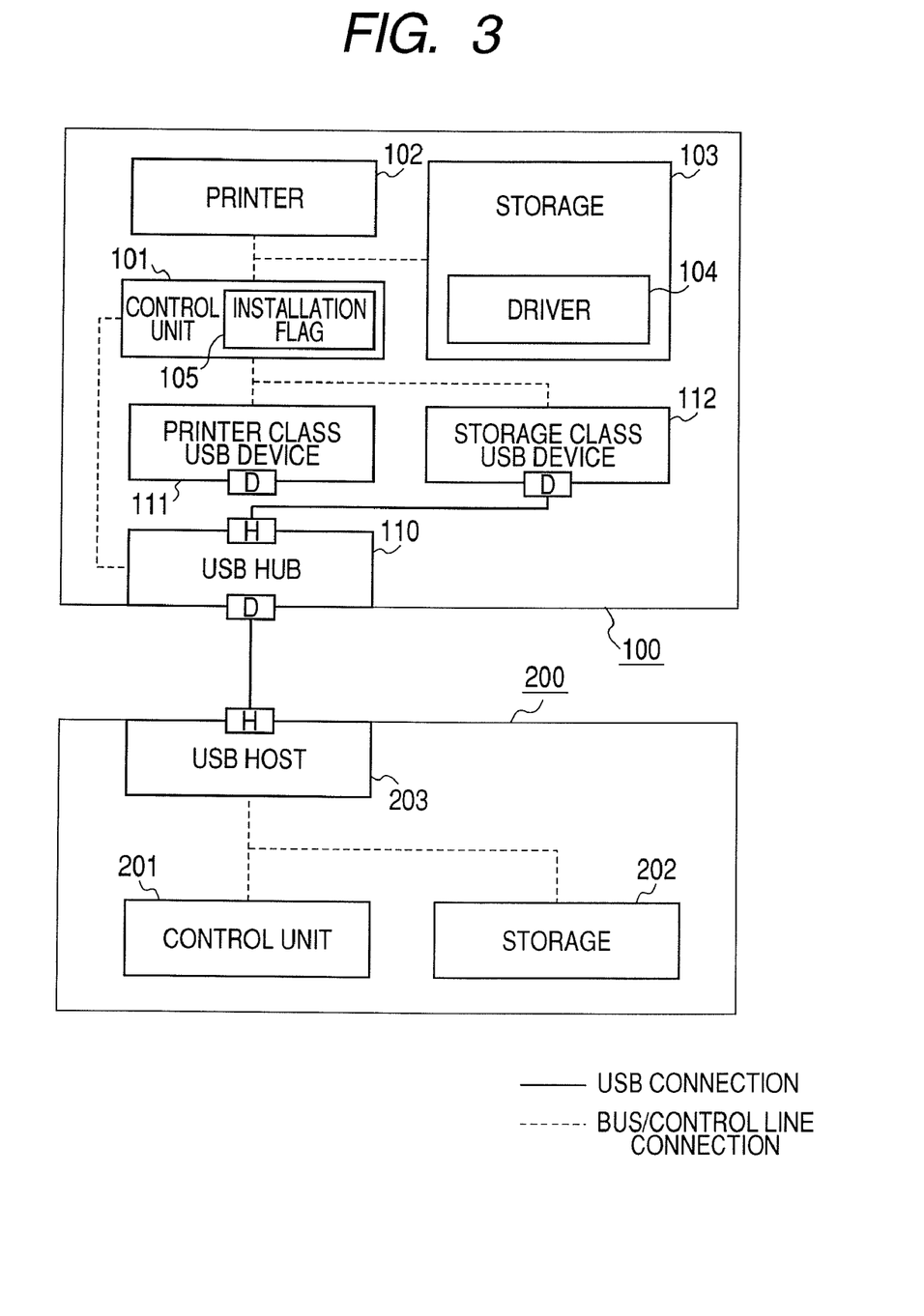
FIG. 3 is an explanatory view illustrating a connection state of the peripheral device of the system of FIG. 1 and a PC (Embodiment 1).

FIGS. 1 and 3 illustrate a construction in which the peripheral device of the present invention is constructed as a compound device. In a USB device, a compound construction generally means a construction including plural functional units and a USB hub.

In these drawings, a peripheral device 100 includes a control unit 101, a printer 102 serving as an information processing unit for executing principal information processing of the present peripheral device, and a storage 103. The storage 103 stores a driver 104, for operating the printer 102 on the OS of a PC 200 serving as a host apparatus.

The peripheral device 100 is equipped with a USB hub 110 as an interface unit for connection with the PC 200. The USB hub 110 is connected with a USB device 111 of printer class for operating the printer 102 as a USB printer, and a USB device 112 of storage class for operating the storage 103 as a USB storage.

The control unit 101 is constituted of a CPU and memory devices such as a RAM, a program-storing ROM to be described later, and a non-volatile ROM. A control program to be described later may be stored, for example, in such ROM. Blocks of the peripheral device 100 are connected to the control unit 101 by a bus, a control line and the like, and are controlled by the control unit 101.

In an appropriate address of a memory of the control unit 101, an installation flag 105 is assigned. The installation flag 105 is used, according to the state thereof as described later, for changing the connection state between the USB hub 110 and the printer class USB device 111.

The installation flag 105 is advantageously positioned on a memory device of which memory content is not lost by turning on/off of the AC power supply, such as a non-volatile ROM, a battery-backup memory, or a hard disc in certain cases.

The installation flag 105 can store two states which are "not installed" and "already installed", and is in the "not installed" state at the shipment from the manufacturer. It is naturally possible also to record the state of the installation flag in the storage 103.

The installation flag 105 is switched by the control unit 101 into two states, "not installed" and "already installed". According to such state, there is executed a control for changing the USB connection in the peripheral device 100 as will be described later. In FIGS. 1 and 3, the installation flag 105 is incorporated in the control unit 101, but, as the storage 103 may be used in common with another memory device of the control unit, it may be recorded, for example, in the storage 103.

The printer 102 is constituted of a printer engine having a printing ability on a recording medium by a suitable recording process such as an ink jet process and also having other functions such as sheet feeding and sheet discharging, and is controlled by the control unit 101.

The storage 103 is a memory device formed, for example, by a ROM, a RAM, an HDD or the like, and stores a driver 104 for operating the printer 102 on the OS of the PC 200. It may be a read-write memory or a read-only memory, or may be used in common with the ROM or RAM of the control unit 101.

The driver 104 is a device driver functioning on the OS of the PC 200. The driver 104 provides the PC 200 with a function of controlling the printer class USB device 111, and with a function of informing the completion of driver installation from the PC 200 to the peripheral device 100. Also the driver 104 includes an installer for installing the driver 104 itself and a setting file for automatically executing the installer on the PC 200.

The USB hub 110, the printer class USB device 111 and the storage class USB device 112 satisfy the USB standard. These units and PC 200 are respectively connected by USB as illustrated. In the drawings, [H] and [D] indicate connections respectively at the host side and at the device side. In the present embodiment, the host/device distinction is made as illustrated, but the host/device combination need not be limited as illustrated in case of utilizing another standard such as USB-On-The-Go.

The USB hub 110 is connected as illustrated, and is rendered capable of turning on/off the connection with the storage class USB device 112 under the control of the control unit 101, according to the state of the installation flag.

Figure 8:
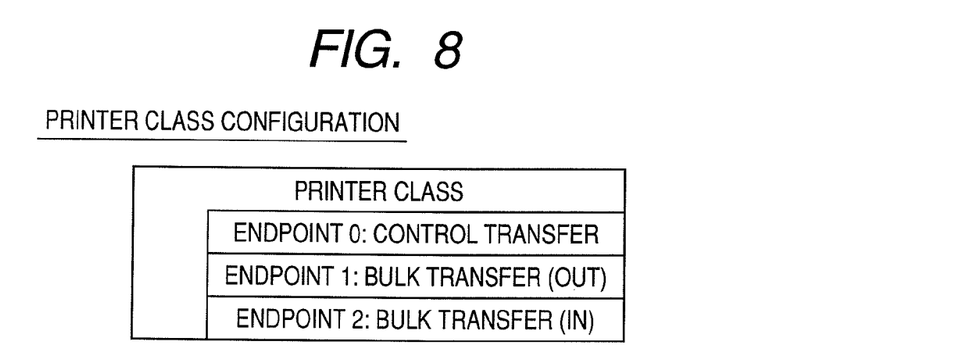
FIG. 8 is an explanatory view illustrating a descriptor/interface/endpoint construction of a printer class in the present invention.

The printer class USB device 111 has a USB device function, and has a construction of descriptor and endpoint as illustrated in FIG. 8. As illustrated in FIG. 8, the printer class USB device 111 is capable of returning the descriptor to the host and of data transmission/reception. Also the peripheral device 100 of the present embodiment, being equipped with the printer 102, is mounted with a printer class. In the case that the peripheral device 100 is equipped for example with an image scanner or the like as the information processing unit, it has to be additionally equipped with a still image class in a composite/compound construction.

Figure 7:
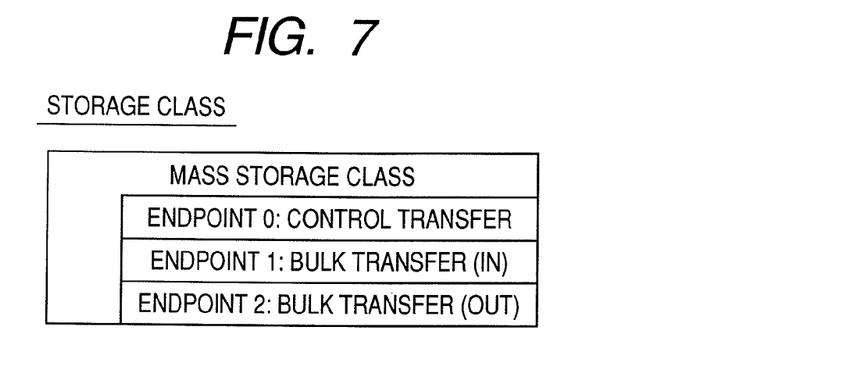
FIG. 7 is an explanatory view illustrating a descriptor/interface/endpoint construction of a storage class in the present invention.

The storage class USB device 112 has a USB device function, and has a construction of descriptor and endpoint as illustrated in FIG. 7. As illustrated in FIG. 7, the USB device 112 is capable of returning the descriptor of the corresponding class to the host and of data transmission/reception, and renders the storage 103 accessible from the host.

The PC 200 is constituted of a control unit 201, a storage 202, a USB host 203 and the like. The PC 200 may be an ordinary PC, or may also be a PDA or a thin client. The present invention is particularly effective in a PDA or a thin client that is limited in the capacity of memory and hard disc and does not have such driver as attached to an OS The control unit 201 includes all the components necessary for constructing the PC, such as a CPU, a storage 202, other storages such as a ROM and a RAM, a USB host 203 and other interfaces, and these components are connected respectively by a bus and a control line. Structures other than the storage 202 and the USB host 203, not directly related with the present embodiment, are omitted from the illustration.

The storage 202 of the PC 200 is constructed by an HDD or a memory in case of an ordinary PC, or by a memory such as ROM or RAM in a PDA or a thin client, and the aforementioned driver 104 is installed in such storage 202.

Also the USB host 203 of the PC 200 has a host function of USB standard, and is capable of connecting and controlling the USB device and of data transmission/reception according to the USB protocol.

In the following the functions of the above-described construction will be described. At first, there will be described a process flow from when the peripheral device 100 is connected to the PC 200 until it becomes operable.

Figure 4:
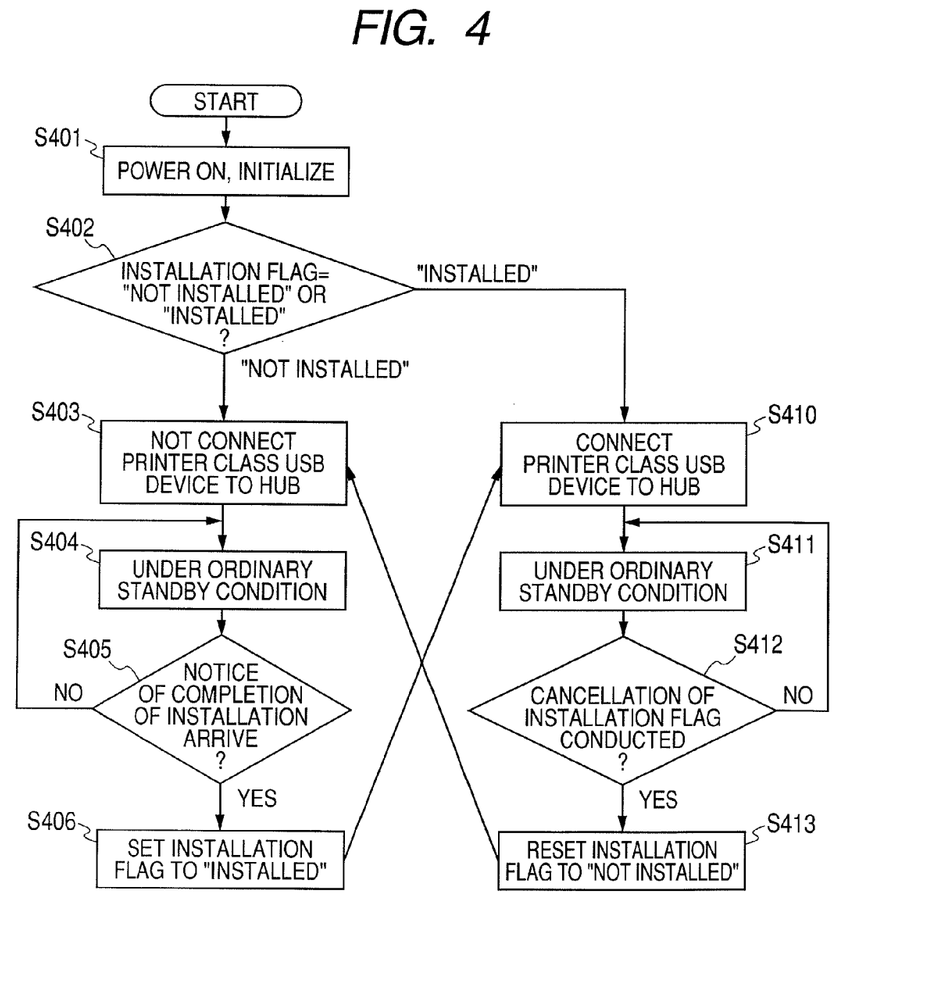
FIG. 4 is a flow chart illustrating a control sequence for the peripheral device in the configuration of FIGS. 1 and 3 (Embodiment 1).
Figure 5:
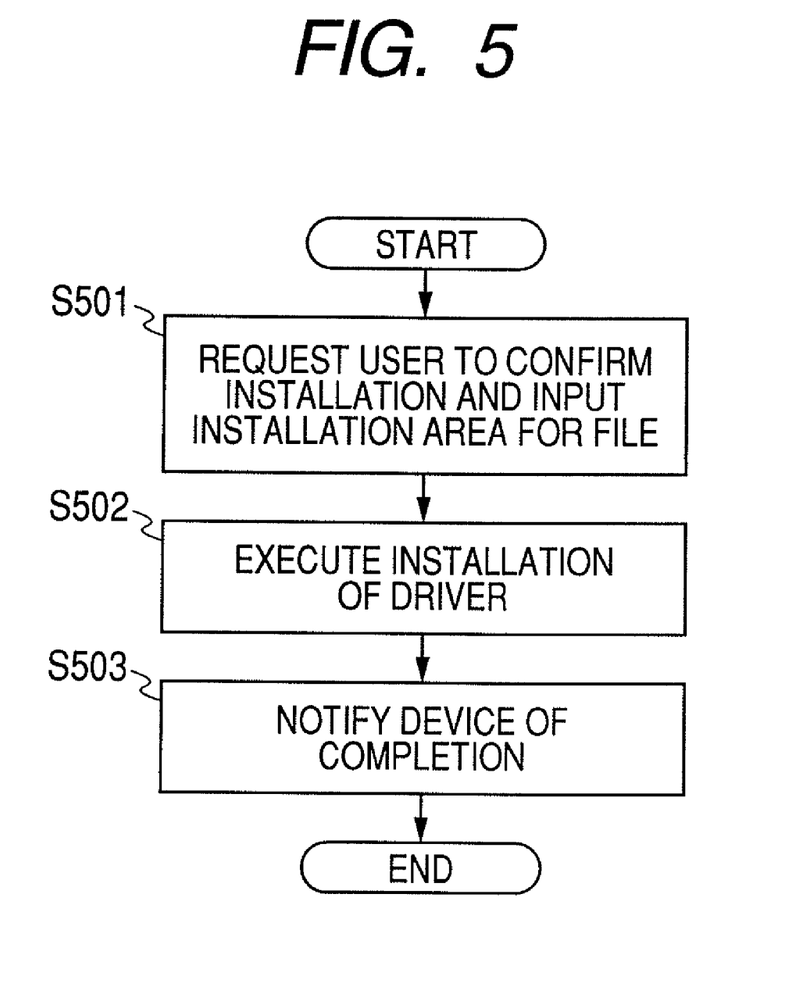
FIG. 5 is a flow chart illustrating a control sequence for an installer of a driver software for the peripheral device.

FIG. 4 is a flow chart representing the internal processes of the peripheral device 100, and FIG. 5 is a flow chart representing the processes of the installer of the driver 104. As the flows in FIGS. 4 and 5 are linked in parallel with the entire operation, reference will be suitably made in the following to the step numbers shown in the flow charts.

Also FIGS. 1 and 3 illustrate a state where the PC 200 and the peripheral device 100 are already connected by a USB cable. The following description will be made from a state after the shipment of the peripheral device 100 and immediately after the purchase by the user, namely a state where the PC 200 and the peripheral device 100 are not yet connected. In the following description, there will be described at first an outlined flow when the user connects the peripheral device 100 to the PC 200, and the installer control of the driver 104 illustrated in FIG. 5, and then a detailed flow of control at the side of the peripheral device 100 illustrated in FIG. 4.

In an initial state of the peripheral device 100 immediately after shipment thereof, a value of the installation flag 105 indicates "not installed" value. When the control unit 101 confirms that the value of the installation flag 105 indicates "not installed" (step S402 to be described later), the internal USB connection becomes as illustrated in FIG. 3. More specifically, in this state, the printer class USB device 111 is not yet connected to the USB hub 110 (step S403 to be described later).

On the other hand, even in this state, the storage 103 is connected to the storage class USB device 112 by the control unit 101 as described above, whereby the storage 103 can be accessed by a SCSI command.

In recent OS, a driver for USB mass storage class is generally made available, owing to the pervasiveness of memory card reader, digital camera and the like. The situation is similar also for a driver for the USB hub. In the OS of the PC 200 of the present embodiment, it is assumed that such an ordinary storage class driver and USB hub driver are installed from the beginning.

When the user makes USB connection of the peripheral device 100 and the PC 200, as the USB hub driver and the mass storage class driver are already installed in the OS of PC 200, at first the USB hub 110 is recognized by the PC 200. Thus, the USB hub 110 is mounted as a USB device on the PC 200. Thereafter the storage class USB device 112, connected to the USB hub 110, is also recognized and mounted.

It is assumed that, in the OS of the PC 200, the storage 103 of the peripheral device 100 is mounted as one of the drives. There is an OS that does not utilize the "drive" concept in the path name for accessing the file, and, in the file system of such OS, the storage 103 is mounted as a part of a directory tree starting from a root directory.

In this manner, the installer, contained in the driver 104 in the storage 103, is rendered executable. One of the methods of executing such installer is a manual activation of the installer contained in the driver 104 in the storage 103 by the user, based on a description on a product handling instruction or the like. Also certain OS are capable of automatically activating (or starting) an execution file of a specified title when a drive or a recording medium is mounted on the file system, and such mechanism may be utilized for activating the installer. The installer is activated by any one of these methods and the driver 104 is installed in the storage 202 of the PC 200.

The installer executes the driver installation according to a process flow as illustrated in FIG. 5. At a step S501, the user is requested to confirm the installation and enter information necessary for the installation, such as an installation location for the file. At a step S502, a driver installation is executed. In Embodiment 1, the driver 104 is a driver of the printer class USB device 111.

At a step S503, the PC 200 notifies the completion of driver installation to the peripheral device 100. This notification can be executed, in case of utilizing the already mounted storage class USB device 112, for example by a method of transmitting a specified vendor request, a method of transmitting a specified SCSI command, or a method of writing a specified value in a specified sector of the device 112. Also a method of transmitting a vendor request to the USB hub 110 may be used.

When the completion of driver installation is notified from the PC 200 by any one of these methods (step S405 to be described later), the peripheral device 100 sets the installation flag 105 to the "already installed" state (step S406 to be described later). Also the printer class USB device 111 is internally USB connected to the USB hub 110 (step S410 to be described later). Thereby, the PC 200 recognizes that the USB printer device is connected through the USB hub 110, and executes mounting of the printer class driver which is in an already installed state.

As described above, merely by a connection of the peripheral device 100 to the PC 200 by the user, the printer driver can be installed in the PC 200.

In the following, the control flow in the peripheral device 100 illustrated in FIG. 4 will be described in detail.

The process in FIG. 4 is initiated when the AC power supply and the software switch of the peripheral device 100 are both turned on, and at first, at a step S401, an initialization of the peripheral device is executed.

At a step S402, the installation flag is checked. As described above, the flag is in a "not installed" state at the shipment from the manufacturer. The sequence proceeds to a step S403 in case of a "not installed" state, or to a step S410 in case of an "already installed" state.

At a step S403, the internal USB connection to the storage class only is made. More specifically, the control unit 101 controls the USB hub 110 in such a manner that the storage class USB device 112 is connected to the USB hub 110 but the printer class USB device 111 is not connected to the USB hub 110, as illustrated in FIG. 3.

At a step S404, the control flow enters a stand-by state of an ordinary peripheral device, and a function of such ordinary peripheral device is executed in this state. In this state, each USB request is responded to, also each request to the storage class USB device 112 is responded to, and a SCSI command is responded to by accessing the storage 103 if necessary.

At the same time, at a step S405, a notification for completion of installation is awaited, and the sequence proceeds to a step S406 when the notice arrives from the PC 200.

At the step S406, the installation flag is set to an "already installed" state, and the sequence proceeds to a step S410. At the step S410, the printer class USB device 111 also is connected to the USB hub 110. The storage class USB device 112 remains connected to the USB hub 110.

Then, at a step S411, the control flow enters a stand-by state of an ordinary peripheral device. In addition to the processes similar to those in the step S404, each USB request to the printer class USB device 111 is responded to. Also print data from the PC 200 are received and printed by controlling the printer 102, and a status signal is transmitted when requested from the PC 200.

At a step S412, whether an installation flag canceling operation by the user is executed in an eternal input unit of the peripheral device 100 is checked. The canceling operation may be executed, for example, by a liquid crystal panel and a switch. Otherwise, the canceling operation may be executed by generating a specified USB vendor request according to an appropriate user operation on the PC 200.

Such installation flag canceling operation is normally unnecessary in the case that the user simply purchases the peripheral device and connects it to the PC 200. However, in the case that the peripheral device 100 is connected to another PC or is given to another user, such canceling operation allows to return the installation flag to the "not installed" state being the same as in the shipment from the manufacturer. In the case that the canceling operation for the installation flag 105 is executed, the sequence proceeds to a step S413, and, if not, the stand-by state is continued in the step S411. At the step S413, the installation flag is set to a "not installed" state, and the sequence proceeds to a step S403.

In the present embodiment, in a state where the driver software is not yet installed in the PC 200, the USB interface is so controlled, as described above, that the PC 200 can access only the storage 103. Thus there can be avoided the prior problems caused by installation of an erroneous driver or a dummy driver. The driver software can be easily and securely installed by executing the installer prepared in the storage, either by a user operation or by an automatic process at the device connection. Thus the printer driver can be installed in the PC 200 merely by the connection of the peripheral device 100 by the user to the PC 200, almost without causing the user to take any cumbersome procedure.

Embodiment 2

The foregoing embodiment has described a case where the peripheral device 100 has a so-called compound construction incorporating a hub, but a similar control is naturally possible also in a case where the peripheral device 100 has a composite construction not incorporating a hub. In the following, description will be simplified or omitted for components equivalent to those described in the foregoing.

Figure 2:
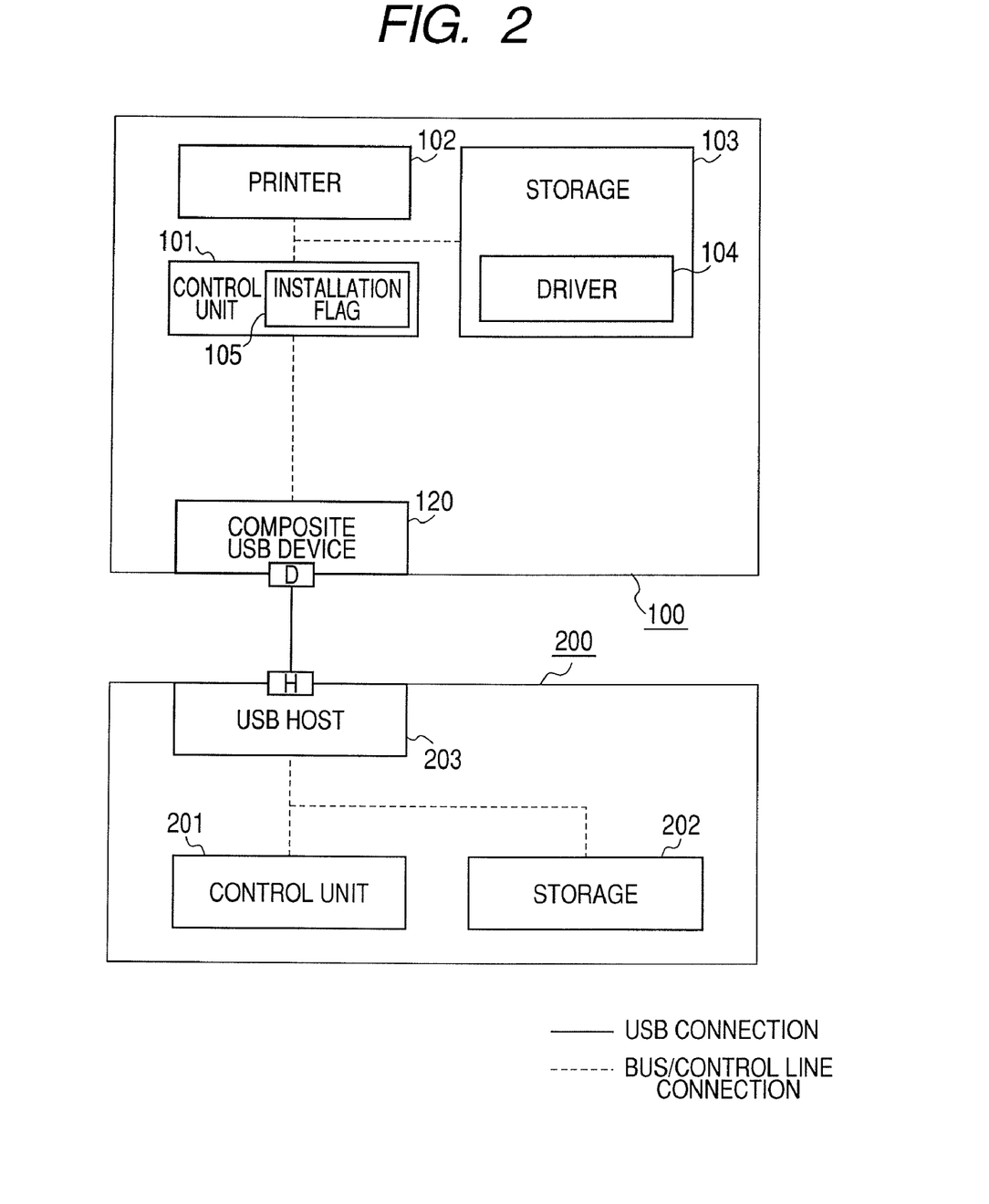
FIG. 2 is an explanatory view illustrating a different system configuration including a peripheral device utilizing the present invention (Embodiment 2).

FIG. 2 illustrates a construction of a system in which the peripheral device 100 is constructed as a composite device. Generally in a USB device, a composite construction means a construction incorporating plural functional units but not incorporating a USB hub.

FIG. 2 illustrates a composite construction having a printer and a storage, but, as in the case of Embodiment 1, the present invention is similarly applicable to a construction having an image scanner and a storage, or to a composite device having both a printer and an image scanner, and the storage.

The peripheral device 100 of the present embodiment includes a control unit 101, a printer 102, a storage 103, a driver 104 and a USB device 120, and the units other than the control unit 101 are connected to the control unit 101 by a bus, a control line and the like, and are controlled by the control unit 101.

Also in the present embodiment, in an appropriate address of a memory of the control unit 101, an installation flag 105 is assigned. The installation flag 105 is used, according to the state thereof as described later, for changing the connection state of the USB device 120.

The installation flag 105 can store two states which are "not installed" and "already installed", and is in the "not installed" state at the shipment from the manufacturer. It is naturally possible also to record the state of the installation flag in the storage 103. Also a control program to be described later is recorded for example in a ROM of the control unit 101.

The printer 102 is constituted of a printer engine of a suitable recording process such as an ink jet process.

The storage 103 is a memory device formed for example by a ROM, a RAM, an HDD or the like, and stores a driver 104 for operating the printer 102 on the OS of the PC 200. It may be a read-write memory or a read-only memory, or may be used in common with the ROM or RAM of the control unit 101.

The driver 104 is a device driver functioning on the OS of the PC 200. The driver 104 provides the PC 200 with a function of controlling the printer class USB device 111, and with a function of informing the completion of driver installation from the PC 200 to the peripheral device 100 as described in the following. Also the driver 104 includes an installer for installing the driver 104 itself and a setting file for automatically executing the installer on the PC 200.

The USB device 120 satisfies the USB standard. The device and PC 200 are USB connected as illustrated. Also in the present embodiment, [H] and [D] indicate connections respectively at the host side and at the device side. In the present embodiment, the host/device distinction is made as illustrated, but the host/device combination need not be limited as illustrated in case of utilizing another standard such as USB-On-The-Go.

In the present embodiment, the USB device 120 is constructed as a storage class and a composite device capable of switching the functions of two device classes.

A first device class of the USB device 120 is a storage class, having a construction of descriptor and endpoints as illustrated in FIG. 7, also capable of returning the descriptor of storage class to the PC 200, conducting data transmission/reception, and enabling access to the storage 103 from the host.

Figure 9:
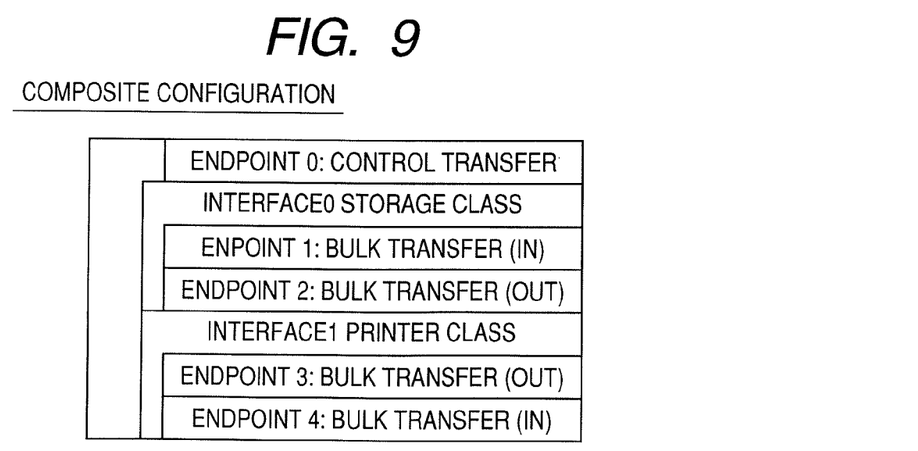
FIG. 9 is an explanatory view illustrating a descriptor/interface/endpoint construction of a composite construction in the present invention.

A second device class of the USB device 120, when the peripheral device is a printer, has a function as a USB device of composite construction, having plural descriptors and interfaces for the storage class and the printer class as illustrated in FIG. 9.

The descriptors illustrated in FIGS. 7 and 9 are used under switching as described in the following. Among the descriptors illustrated in FIGS. 7 and 9, for example a vendor ID, a product ID and a serial number of the device descriptor and a product name of the string descriptor are made different depending on the construction of the USB device. For example, in the construction of FIG. 7 and the construction of FIG. 9, respectively different character trains are used for the aforementioned descriptors. Also when the USB device is switched from the construction of FIG. 7 to that of FIG. 9, it has naturally to be recognized as a completely different device by the PC 200.

In the case that the peripheral device 100 is a composite device having further an image scanner, such image scanner can be added to the composite construction illustrated in FIG. 9, as a still image class or a device class having an interface and endpoints of a vendor class.

In the present embodiment, the PC 200 is assumed to be constructed in a similar manner as in Embodiment 1 and will not be described in detail. The PC 200 is connected with the USB device 120 of the peripheral device 100 through a USB host 203.

In the following the functions of the above-described construction will be described. At first there will be described a process flow when the peripheral device 100 is connected to the PC 200 and until it becomes operable.

Figure 6:
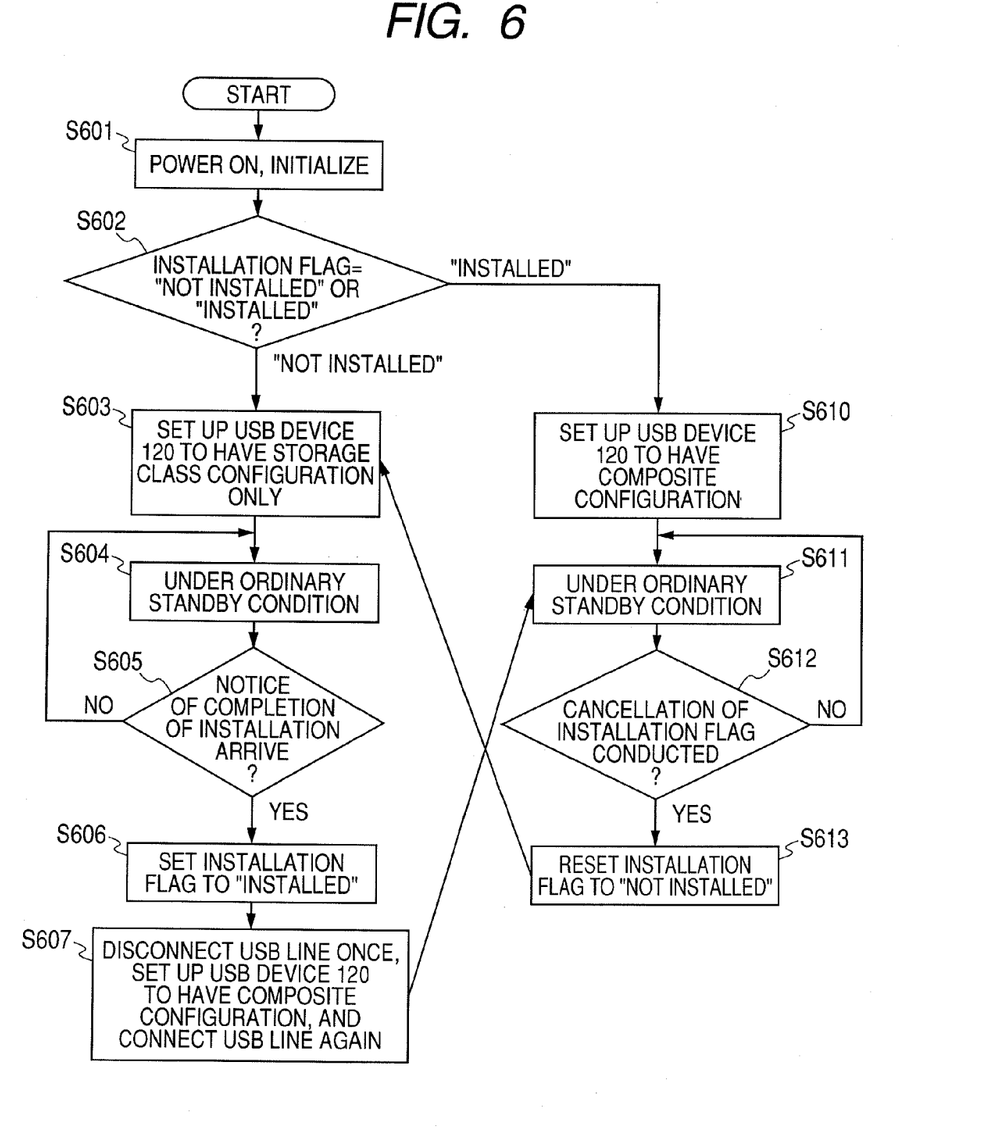
FIG. 6 is a flow chart illustrating a control sequence for the peripheral device in the configuration of FIG. 2 (Embodiment 2).

FIG. 6 corresponds to FIG. 4 in Embodiment 1, and represents the internal process of the peripheral device 100. The function of the installer is same as in Embodiment 1 and as illustrated in FIG. 5.

Also FIG. 2 illustrates a state where the PC 200 and the peripheral device 100 are already connected by a USB cable. The following description will be made from a state after the shipment of the peripheral device 100 and immediately after the purchase by the user, namely a state where the PC 200 and the peripheral device 100 are not yet connected. In the following description, there will be described at first an outlined flow when the user connects the peripheral device 100 to the PC 200, and the installer control of the driver 104 illustrated in FIG. 5, and then a detailed control flow at the side of the peripheral device 100 illustrated in FIG. 6.

In an initial state of the peripheral device 100 immediately after shipment thereof, a value of the installation flag indicates "not installed". When the control unit 101 confirms the value of the installation flag 105 as "not installed" (step S602 to be described later), the USB device 120 is made to have a construction of storage class only (step S603 to be described later). More specifically, in this state, the storage 103 (alone) serves as the storage class USB device of the USB device 120 under the control by the control unit 101, and the storage 103 is made accessible by a SCSI command to the USB device 120.

In recent OS, a driver for USB mass storage class is generally bundled, owing to the pervasiveness of memory card reader, digital camera and the like. The situation is similar also for a driver for the USB hub. In the OS of the PC 200 of the present embodiment, it is assumed that such ordinary (non-composite) storage class driver and USB hub driver are installed from the beginning. However, the storage class driver matching the composite construction may be incorporated only in the latest OS, but, in consideration of such situation, the storage class driver matching the composite construction can be incorporated in the driver 104.

Also in the case that the OS of the PC 200 has only the non-composite storage class driver, the following operations are made possible by operating, in the initial state as described above, the USB device 120 as a USB device of the storage class only.

When the peripheral device 100 and the PC 200 are connected by the user, the mass storage class driver, already installed in the OS of the PC 200, functions whereby the USB device 120 serving as the storage class USB device is recognized and mounted.

In the OS of the PC 200, it is assumed that, the storage 103 of the peripheral device 100 is mounted as one of the drives. There is an OS that does not utilize the "drive" concept in the path name for accessing the file, and, in the file system of such OS, the storage 103 is mounted as a part of a directory tree starting from a root directory.

In this manner, the installer, contained in the driver 104 in the storage 103, is rendered executable. One of the methods of executing such installer is a manual activation of the installer contained in the driver 104 in the storage 103 by the user, based on a description on a product handling instruction or the like. Also certain OS are capable of automatically activating an execution file of a specified title when a drive or a recording medium is mounted on the file system, and such mechanism may be utilized for activating the installer. The installer is activated by any one of these methods and the driver 104 is installed in the storage 202 of the PC 200.

The process flow of the installer is as illustrated in FIG. 5. At a step S501, the user is requested to confirm the installation and enter information necessary for the installation such as an installation location for the file. At a step S502, a driver installation is executed. In the present embodiment, the driver 104 has a definition file of composite construction as illustrated in FIG. 9, and a printer class driver matching the composite construction (or also a storage driver matching the composite construction).

A step S503 notifies the completion of driver installation from the PC 200 to the peripheral device 100. This notification can be executed, in case of utilizing the already mounted storage class device, for example by a method of transmitting a specified vendor request, a method of transmitting a specified SCSI command, or a method of writing a specified value in a specified sector of the storage device. Also a method of transmitting a vendor request to the USB device 120 may be used.

When the completion of driver installation is notified from the PC 200 by any one of these methods (step S605 to be described later), the peripheral device 100 sets the installation flag 105 to the "already installed" state (step S606 to be described later). Also the USB connection between the PC 200 and the peripheral device 100 is disconnected by the USB device 120 under the control of the control unit 101 (step S607 to be described later). In this state, the physical USB cable between the PC 200 and the peripheral device 100 remains connected.

Then, in the composite USB device, the descriptor/endpoint/interface construction is switched from one in FIG. 7 to one in FIG. 9. Thereafter the connection is interrupted, and, after a certain time, the electrical connection between the PC 200 and the peripheral device 100 is restored.

Thus the PC 200 recognizes connection of a composite USB device having both a storage class and a printer class, different from the one that has been connected. In response, the PC 200 mounts the printer class driver and the already installed storage class driver, which corresponds to the composite construction.

As described above, the printer driver can be installed in the PC 200 merely by a connection of the peripheral device 100 to the PC 200 by the user.

In the following, the control flow in the peripheral device 100 illustrated in FIG. 6 will be described in detail.

The process in FIG. 6 is initiated when the AC power supply and the software switch of the peripheral device 100 are both turned on, and at first a step S601 executes an initialization of the peripheral device.

At a step S602, the installation flag is checked. As described above, the flag is in a "not installed" state at the shipment from the manufacturer. The sequence proceeds to a step S603 in case of a "not installed" state, or to a step S610 in case of an "already installed" state.

In a step S603, the USB device 120 is made to have a construction of only the storage class illustrated in FIG. 7. At a step S604, the control flow enters an ordinary stand-by state for the peripheral devices, and functions of such ordinary peripheral devices are executed in this state. In this state, each USB request is responded to, also each request to the USB device 120 functioning as the storage class is responded to, and a SCSI command is responded to by accessing the storage 103 if necessary.

At the same time, at a step S605, a notification for completion of installation is awaited, and the sequence proceeds to a step S606 when the notice arrives from the PC 200.

At the step S606, the installation flag 105 is set to an "already installed" state, and the sequence proceeds to a step S607. At the step S607, the USB connection between the PC 200 and the peripheral device 100 is electrically disconnected by the control of the USB device 120 under the control unit 101. In this state, the physical USB cable between the PC 200 and the peripheral device 100 remains connected.

Then, in the composite USB device, the descriptor/endpoint/interface construction is switched from one in FIG. 7 to one in FIG. 9, then the electrical connection between the PC 200 and the peripheral device 100 is restored, and the sequence proceeds to a step S611. In a step S610, the USB device 120 assumes the composite construction illustrated in FIG. 9.

Then, at a step S611, the control flow enters an ordinary stand-by state for the peripheral devices. In addition to the processes similar to those in the step S604, each USB request to the printer class USB interface of the USB device 120 is responded to. Also print data from the PC 200 are received and printed by controlling the printer 102, and a status signal is transmitted when requested from the PC 200.

At a step S612, whether an installation flag canceling operation by the user is executed in an eternal input unit of the peripheral device 100 is checked. The canceling operation may be executed, for example, by a liquid crystal panel and a switch. Otherwise, the canceling operation may be executed by generating a specified USB vendor request according to an appropriate user operation on the PC 200.

Such installation flag canceling operation is normally unnecessary in the case that the user simply purchases the peripheral device and connects it to the PC 200. However, in the case that the peripheral device 100 is connected to another PC or is given to another user, such canceling operation allows to return the installation flag to the "not installed" state being the same as in the shipment from the manufacturer. In the case that the canceling operation for the installation flag 105 is executed, the sequence proceeds to a step S613, and, if not, the stand-by state is continued in the step S611. At the step S613, the installation flag is set to a "not installed" state, and the sequence proceeds to a step S603.

In the present embodiment, in a state where the driver software is not yet installed in the PC 200, the USB interface is so controlled, as described above, that the PC 200 can access only the storage 103. Thus there can be avoided the prior problems caused by installation of an erroneous driver or a dummy driver. The driver software can be easily and securely installed by executing the installer prepared in the storage unit, either by a user operation or by an automatic process at the device connection. Thus the printer driver can be installed in the PC 200 merely by the connection of the peripheral device 100 by the user to the PC 200, almost without using the user to take any cumbersome procedure.

According to the present invention, in a state where the driver software of the information processing unit is not yet installed in the host apparatus, the interface unit is so controlled that the host apparatus can only access the storage unit. Thus there can be avoided the prior problems caused by installation of an erroneous driver or a dummy driver. The driver software of the information processing unit can be easily and securely installed by executing an installer prepared in the storage unit, either by a user operation or by an automatic process at the device connection. Thus the present invention enables, when the peripheral device is connected to the host apparatus for the first time, to easily and securely install the driver software of the peripheral device in the host apparatus, thereby enabling the proper operation of the peripheral device.

This application claims the benefit of Japanese Patent Application No. 2006-322720, filed Nov. 30, 2006, which is hereby incorporated by reference herein in its entirety.

The invention claimed is:

1. An information processing apparatus comprising:
an information processing unit which executes a predetermined processing, according to a control by a host apparatus connected to the information processing apparatus;
a storage unit which stores a driver software to function on the host apparatus for utilizing the information processing unit by the host apparatus;
a determination unit which determines whether the driver software stored in the storage unit is not yet installed in the host apparatus, based on flag information indicating a non-installed state or an already installed state; and
a control unit which receives a notification for completion of installation of the driver software from the host apparatus, and, in response to the reception of the notification, sets a value indicating an already installed state in the flag information, and which controls an access by the host apparatus when the determination unit determines that the driver software is not yet installed in the host apparatus, in such a manner that the host apparatus can access the storage unit for an install of the driver software and an access by the host apparatus to the information processing unit is restricted, and which controls, when the determination unit determines that the driver software is already installed in the host apparatus, in such a manner that the host apparatus can access the information processing unit for execution of the predetermined processing.

2. An information processing apparatus according to claim 1, wherein, in response to an instruction by a user, a value indicating the non-installed state is set in the installation flag.

3. An information processing apparatus according to claim 1, comprising an image recording unit as the information processing unit.

4. An information processing apparatus according to claim 1, comprising an image reading unit as the information processing unit.

5. An information processing apparatus according to claim 1, further comprising an interface unit which connects the information processing unit and the storage unit with the host apparatus;
wherein the control unit controls the access by the host apparatus with the information processing unit and the storage unit, by changing a connection of the interface unit with the host apparatus.

6. An information processing apparatus according to claim 5, wherein the interface unit is constituted of a USB hub so connectable that the host apparatus can access the information processing unit and the storage unit each as a USB device.

7. A control method for an information processing apparatus including:
- an information processing unit which executes a predetermined processing, according to a control by a host apparatus connected to the information processing apparatus; and
- a storage unit which stores a driver software to function on the host apparatus for utilizing the information processing unit by the host apparatus, the method comprising:
- determining whether the driver software stored in the storage unit is not yet installed in the host apparatus, based on flag information indicating a non-installed state or an already installed state;
- receiving a notification for completion of installation of the driver software from the host apparatus, and, in response to the reception of the notification, setting a value indicating an already installed state in the flag information; and
- controlling an access by the host apparatus, when the driver software is determined as not yet installed in the host apparatus, in such a manner that the host apparatus can access the storage unit for an install of the driver software and an access by the host apparatus to the information processing unit is restricted, and controlling, when the driver software is determined as already installed in the host apparatus, in such a manner that the host apparatus can access the information processing unit for execution of the predetermined processing.

8. A control method for an information processing apparatus according to claim 7, wherein, in response to an instruction by a user, a value indicating the non-installed state is set in the installation flag.

9. A control method for an information processing apparatus according to claim 7, wherein the information processing apparatus further comprises an interface unit which connects the information processing unit and the storage unit with the host apparatus, and
- wherein the control step controls the access by the host apparatus with the information processing unit and the storage unit, by changing a connection of the interface unit with the host apparatus.

10. A control method for an information processing apparatus according to claim 7, wherein the interface unit is constituted of a USB hub so connectable that the host apparatus can access the information processing unit and the storage unit each as a USB device.

11. A control method for an information processing apparatus according to claim 7, wherein an image recording unit is included as the information processing unit.

12. A control method for an information processing apparatus according to claim 7, wherein an image reading unit is included as the information processing unit.

13. A non-transitory computer-readable storage medium storing a control program for an information processing apparatus, wherein the information processing apparatus comprises:
- an information processing unit which executes a predetermined processing, according to a control by a host apparatus connected to the information processing apparatus; and
- a storage unit which stores a driver software to function on a host apparatus for utilizing the information processing unit by the host apparatus,
- wherein the information processing apparatus executes the program to perform the steps of:
- determining whether the driver software stored in the storage unit is not yet installed in the host apparatus, based on flag information indicating a non-installed state or an already installed state;
- receiving a notification for completion of installation of the driver software from the host apparatus, and, in response to the reception of the notification, setting a value indicating an already installed state in the flag information; and
- controlling an access by the host apparatus, when the driver software is determined as not yet installed in the host apparatus, in such a manner that the host apparatus can access the storage unit for an install of the driver software and an access by the host apparatus to the information processing unit is restricted, and controlling, when the driver software is determined as already installed in the host apparatus, in such a manner that the host apparatus can access the information processing unit for execution of the predetermined processing.

* * * * *